(12) United States Patent
Guo

(10) Patent No.: US 10,161,422 B2
(45) Date of Patent: Dec. 25, 2018

(54) MULTI-PRESSURE HYDRAULIC SUPPLY SYSTEM FOR AN AUTOMATIC TRANSMISSION

(71) Applicant: BorgWarner Inc., Auburn Hills, MI (US)

(72) Inventor: Chengyun Guo, Novi, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 15/503,933

(22) PCT Filed: Aug. 4, 2015

(86) PCT No.: PCT/US2015/043560
§ 371 (c)(1),
(2) Date: Feb. 14, 2017

(87) PCT Pub. No.: WO2016/025231
PCT Pub. Date: Feb. 18, 2016

(65) Prior Publication Data
US 2017/0306988 A1   Oct. 26, 2017

Related U.S. Application Data

(60) Provisional application No. 62/037,755, filed on Aug. 15, 2014.

(51) Int. Cl.
*F16D 31/02* (2006.01)
*F15B 11/16* (2006.01)
(Continued)

(52) U.S. Cl.
CPC ............... *F15B 11/16* (2013.01); *F15B 1/02* (2013.01); *F16H 57/0436* (2013.01);
(Continued)

(58) Field of Classification Search
CPC ........ F15B 1/024; F15B 11/165; F15B 11/17; F15B 2211/45; F16H 61/0021; F16H 61/0025; F16H 61/4043; F16H 61/4063
See application file for complete search history.

(56) References Cited

U.S. PATENT DOCUMENTS 4,813,234 A * 3/1989 Nikolaus ............... F16H 61/444
60/484
5,018,935 A * 5/1991 Gage ....................... F15B 13/01
60/493

(Continued)

FOREIGN PATENT DOCUMENTS

CN   101230920 A   7/2008
CN   101400917 A   4/2009

(Continued)

OTHER PUBLICATIONS

First Office Action for PCT/US2015/043560/CN201580042246.8 dated Aug. 10, 2017, by the State Intellectual Property Office of China.

(Continued)

*Primary Examiner* — Michael Leslie
(74) *Attorney, Agent, or Firm* — Warn Partners, P.C.

(57) ABSTRACT

A pressurized fluid supply system for a vehicle transmission is provided. The fluid supply system has a pump with at least high and low pressure outputs that supplies high and low pressure components via a directional valve. The pressurized fluid supply system minimizes the parasitic loss upon a vehicle engine.

1 Claim, 3 Drawing Sheets

(51) Int. Cl.
*F16H 61/00* (2006.01)
*F16H 57/04* (2010.01)
*F15B 1/02* (2006.01)
*F16H 61/30* (2006.01)

(52) U.S. Cl.
CPC ..... *F16H 57/0446* (2013.01); *F16H 61/0021* (2013.01); *F16H 61/0025* (2013.01); *F16H 61/30* (2013.01); *F15B 2211/2053* (2013.01); *F15B 2211/20592* (2013.01); *F15B 2211/30505* (2013.01); *F15B 2211/31564* (2013.01); *F15B 2211/5158* (2013.01); *F16H 2061/0034* (2013.01); *F16H 2061/0037* (2013.01)

(56) References Cited

U.S. PATENT DOCUMENTS

| | | | |
|---|---|---|---|
| 6,848,548 | B2 | 2/2005 | Alfredsson |
| 7,665,930 | B2 * | 2/2010 | Kennedy ............... F15B 21/042 405/132 |
| 7,766,139 | B2 | 8/2010 | De Maziere et al. |
| 8,069,661 | B2 | 12/2011 | Hendrickson et al. |
| 8,266,986 | B2 | 9/2012 | Holmes et al. |
| 8,480,539 | B2 | 7/2013 | Hwang et al. |
| 9,151,380 | B2 | 10/2015 | Hwang et al. |
| 9,291,078 | B2 | 3/2016 | Wi et al. |
| 9,366,337 | B2 | 6/2016 | Wi |
| 2003/0075408 | A1 | 4/2003 | Alfredsson |
| 2008/0035443 | A1 | 2/2008 | De Maziere et al. |
| 2008/0179158 | A1 | 7/2008 | De Maziere |
| 2009/0088297 | A1 | 4/2009 | Grethel et al. |
| 2012/0040792 | A1 | 2/2012 | Ito |
| 2013/0269802 | A1 | 10/2013 | Hwang et al. |

FOREIGN PATENT DOCUMENTS

| | | |
|---|---|---|
| CN | 101839335 A | 9/2010 |
| CN | 102128259 A | 7/2011 |
| CN | 103671006 A | 3/2014 |
| CN | 104454695 A | 3/2015 |
| DE | 102010018192 A1 | 12/2010 |
| DE | 102011077552 A1 | 12/2012 |
| DE | 102013211123 A1 | 12/2013 |
| JP | H10266978 A | 10/1998 |
| JP | 2003156132 A | 5/2003 |
| JP | 2009270657 A | 11/2009 |

OTHER PUBLICATIONS

Search Report for PCT/US2015/043560/CN201580042246.8 dated Jul. 28, 2017, by the State Intellectual Property Office of China.
International Search Report of PCT/US2015/043560 dated Oct. 16, 2015.

* cited by examiner

MULTI-PRESSURE HYDRAULIC SUPPLY SYSTEM FOR AN AUTOMATIC TRANSMISSION

CROSS REFERENCE TO RELATED APPLICATIONS

This application is a National Stage of International Application No. PCT/US2015/043560, filed Aug. 4, 2015. This application claims priority to U.S. Provisional Patent Application No. 62/037,755 filed on Aug. 15, 2014. The disclosures of the above applications are incorporated herein by reference.

FIELD OF THE INVENTION

The present invention relates to pressurized hydraulic fluid supply system for automatic transmissions.

BACKGROUND OF THE INVENTION

Automatic transmissions for vehicles require a source of pressurized fluid. The source of pressurized fluid is typically a hydraulic pump powered by the vehicle engine. The pump is parasitic load on the vehicle engine. In a quest to improve vehicle mileage, it is desirable to minimize the parasitic load provided by the hydraulic pump of the transmission.

SUMMARY OF THE INVENTION

To make manifest the above noted and other desires, a revelation of the present invention is brought forth. In a preferred embodiment, the present invention provides freedom of a hydraulic system for an automatic transmission having a pump with both low and high pressure outlets. One of the pressure outlets is connected with a directional valve having a first position delivering pressurized fluid from an outlet range matched pressurized fluid consuming components, a second position delivering pressurized fluid to non-range matched pressurized fluid components, and a third position delivering non-pressurized fluid to an inlet of the pump.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
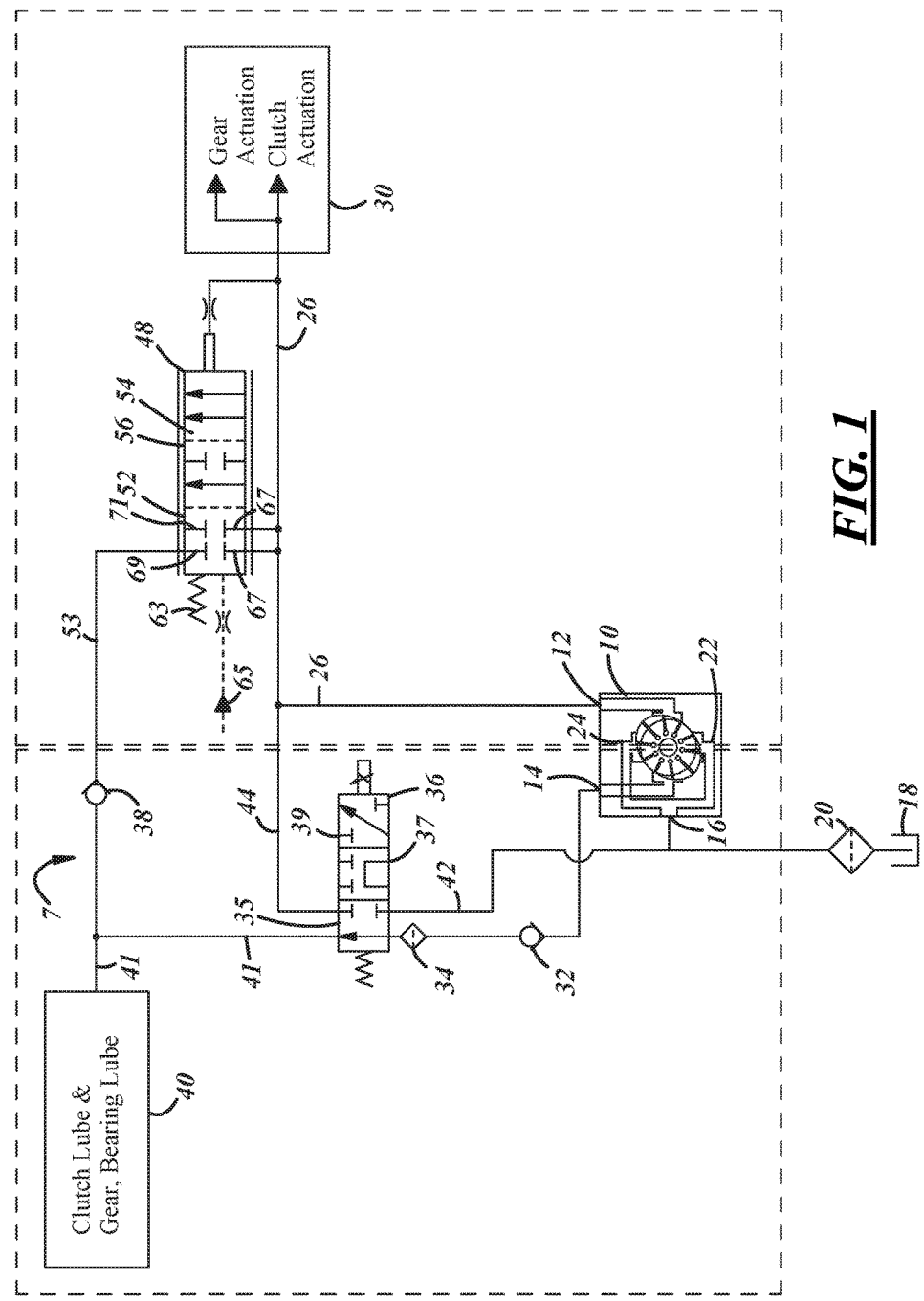
FIG. 1 is schematic view of a pressurized fluid system for an automotive vehicle transmission according to the present invention.

Referring to FIG. 1, a multiple pressure hydraulic supply system for an automotive transmission is provided. The system 7 has a pressurized fluid source provided by a balanced vane pump 10. Pump 10 has a high pressure outlet 12 and a low pressure outlet 14. The inlet 16 of the pump 10 is connected with a sump 18 via a filter 20. Inlet 16 is connected with a lower branch 22 and an upper branch 24 of the pump 10.

Outlet 12 is connected with a line 26. The high pressure line 26 connects the high pressure outlet 12 with high pressure hydraulic fluid consuming components 30 which are various clutches, and gear actuators of the transmission.

Pump low pressure outlet 14 and filter 34 is connected with a directional valve 36, which is shown as a direct control, electrically actuated valve. There is a check valve 32 between the low pressure outlet 14 and fitter 34. Alternatively this can be a two-stage directional valve as well. The directional valve 36 has a first position 35 connecting the directional valve via a line 41 with low pressure consuming function components 40 which includes cooling and lubrication for the clutch, gears, and bearings. In a third position 37 directional valve 36 connects the low pressure outlet with the pump inlet line 16 via line 42. In a second position 39 directional valve 36 is connected the outlet 14 with lines 44 and 26 which connects with high pressure components 30. The high pressure line 26 is also connected with a pressure regulator valve 48.

The pressure regulator valve 48 is used to properly control the line pressure in high pressure line 26, and bleed the surplus flow to low pressure lube/cooling 40 as well as dump the excessive flow back to the inlet 16 of the pump 10. The pressure regulator valve 48 has one end under the feedback pressure while the other ends with a bias spring 63 and a pilot pressure 65, which connects with a proportional pressure control solenoid valve (not shown). The pressure regulator valve 48 includes two supply ports 67 connecting with the high pressure line 26. A port 69 connects with a low pressure cooler/lube line 53 and a port 71 connects with the pump inlet 16. Low pressure cooler/lube line 53 connects with low pressure consuming friction components 40 via a check valve 38.

In FIG. 1, the pressure regulator valve 48 is shown in the closed, non-regulating position 52, at such position the engine either is off or running at idle speeds when there is no excess flow. When the hydraulic pressure supplied from the pump 10 increases and the flow is excessive, the pressure regulator valve 48 moves to a second regulating position 56, where part of the flow is bled off to the low pressure cooler/lube line 53. When the engine speed further increases to mid or high operating speed, the pressure regulator valve 48 is moved to a third position 54. At this point, the valve flow bleeds both to the low pressure lube/cooling line 40 and to the pump inlet 16 line. Under all above three operating conditions, the regulated high pressure fluid is provided to the high pressure actuation such as gear shifting or clutch actuation indicated as 30 in FIG. 1

In operation when the engine speed is low, but there is a need to maintain the adequate line pressure, the directional valve 36 switches to position 36 and main pressure regulator will be at any intermediate position between 52and 56 depending on the line pressure requirement. Under such condition, flow from both sides of the pump will go to main line 26.

When the engine speed is above certain point, the vehicle is at cruise speed but neither requires the high line pressure for actuation or the high cooling/lubrication flow for clutches and gears, the high pressure side of the pump will be capable to provide enough flow through line 10 to maintain the adequate line pressure. Under such condition, the directional valve 36 will move to the middle position 37, the flow from the low pressure side of the pump 14 recirculates back to the pump inlet 16, which consumes the minimum power. The main regulator 48 at this moment, depending on the required line pressure, can be at any intermediate position.

When the vehicle is at high energy launch, it requires both the moderate high line pressure for actuation and high cooling/lubrication flow. Under such condition, because of the reasonably high engine speed, the flow from the high pressure side of the pump is capable to maintain adequate line pressure through line 10 and 26. The main pressure regulator is at any intermediate position of 52, 56, or 54 depending on the required line pressure. The directional valve 36 will be switched to position 35, which routes the flow from low pressure side of the pump to line 41, and connects directly to the clutch and gear lube line.

Figure 2:
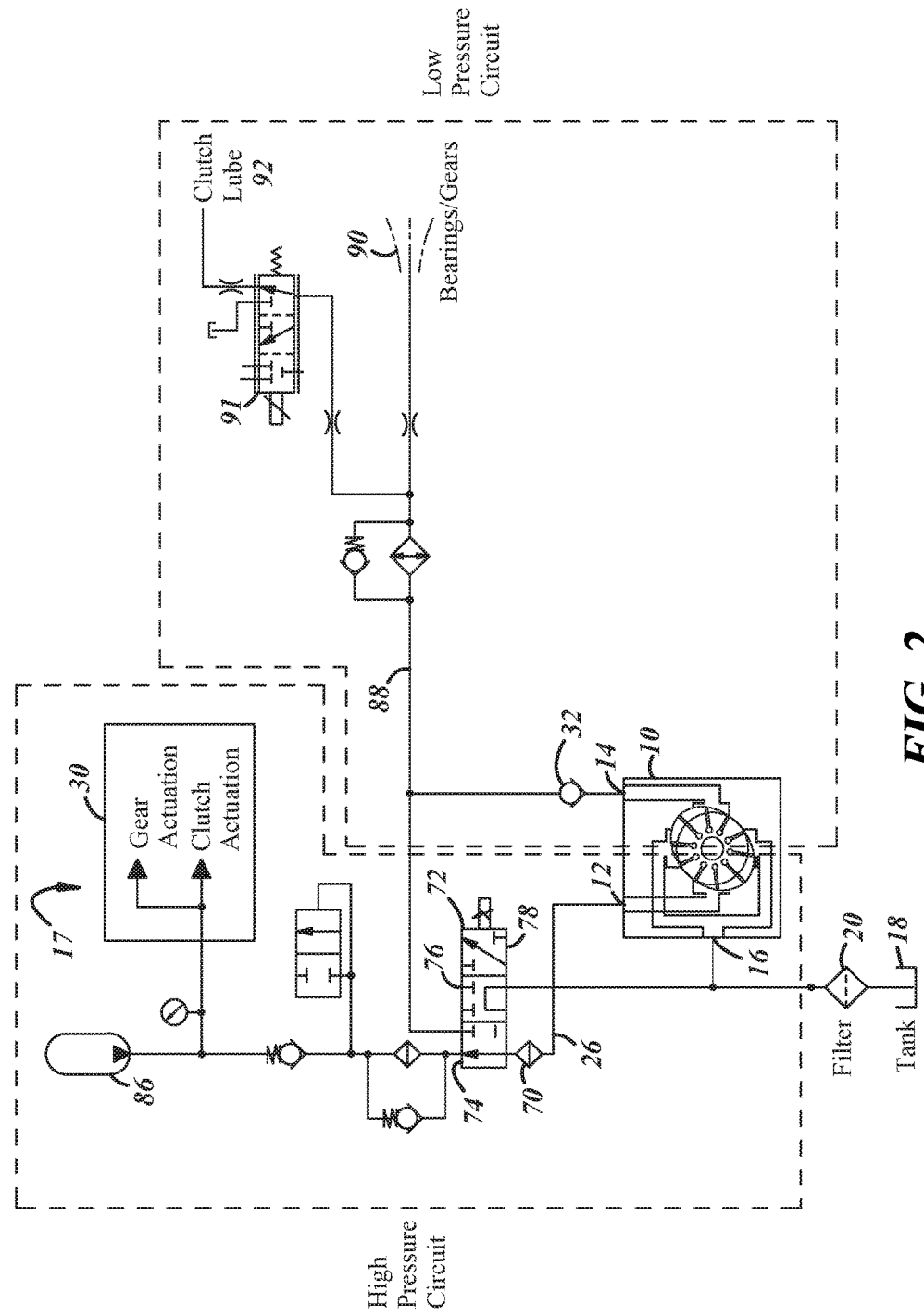
FIG. 2 is a schematic view of an alternate embodiment pressurized fluid supply system to that shown in FIG. 1.

Referring to FIG. 2 an alternate preferred embodiment hydraulic supply system 17 of the present invention is provided with items performing functions identical or similar to that of FIG. 1, being given identical reference numbers. Vane pump 10 has a high pressure outlet 12 connected with a directional valve 72 via a filter 70 and provided in a high pressure line 26. In a first position 74 the directional—valve 72 connects the high pressure outlet 12 with an accumulator 86, which connects with the high pressure hydraulically powered components 30 which include gear actuation, and clutch actuation of the transmission. When directional valve 72 is moved from its first position 74 connecting with the accumulator and high pressure components 30, to a third position 76, fluid from outlet 12 recirculates into the inlet 16 of the pump 10. When directional valve 72 is moved to its second position 78 the outlet 12 is fluidly connected with low pressure line 88 to be delivered to cooling/lube line of bearing or gear 90, and clutch 92 via a flow control valve 91.

In operation high pressure outlet 12 charges accumulator 86 when the directional valve is in position 74. Once the accumulator 86 is fully charged, solenoid valve 72 is switched to position 76 or 72 depending upon operating needs. If a high actuation load is needed for high pressure components 30, especially when engine speed is low, then components 30 can receive pressurized fluid from both the high pressure outlet 12 and the accumulator 86, or both if needed. When there is no high flow needed for actuation of the components 30, directional valve 72 can proceed to position 76. In such operating mode, the cooling/lubrication flow requirements can be met fully by low pressure output portion 14 while the output portion 12 recirculates back to pump inlet. When high lube flow is required and no longer met by the pump output 14 alone during high energy launching, directional valve 72 will be switched to position 78 and flow from the outlet 12 and outlet 14 will both go to the cooling/lube circuit.

Figure 3:
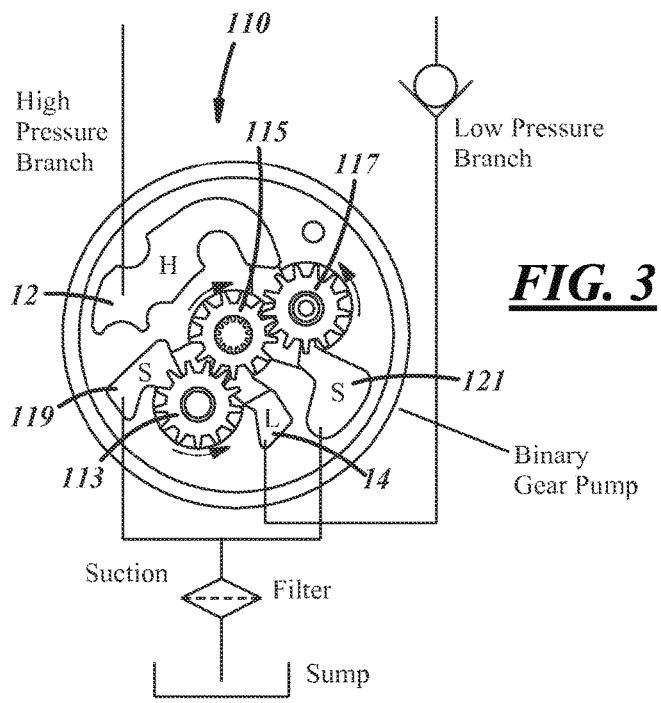
FIG. 3 is a schematic view of a pump utilized in the pressurized fluid system of the present invention.
Figure 4:
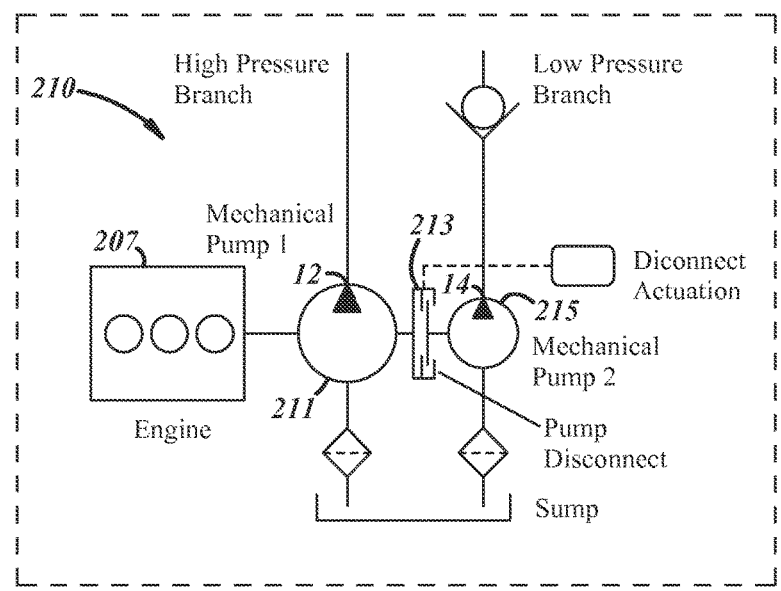
FIG. 4 is a schematic view of yet another embodiment of a pump utilized as a pressurized fluid source for a pressurized fluid system according to the present invention.

FIG. 3 illustrates a binary gear pump 100 having a high pressure output 12, a low pressure output 14, suction inlets 119 and 121. Pump 110 can be a substitute for vane pump 10 shown in FIGS. 1 and 2. In another alternative pump arrangement 210 is provided having a high pressure pump 211 driven by the engine 207 via pulley, direct shaft or via a shaft powered by the transmission which in turn powers the low pressure outlet pump 215 via a clutch 213. When low pressure output is undesirable clutch 213 will open disconnecting low pressure pump 215.

The description of the invention is merely exemplary in nature and, thus, variations that do not depart from the gist of the invention are intended to be within the scope of the invention. Such variations are not to be regarded as a departure from the spirit and scope of the invention.

I claim:

1. A multiple pressure hydraulic supply system for an automotive vehicle transmission, said transmission having at least a first lower pressure range of pressurized fluid consuming components and a second higher pressure range of pressurized fluid consuming components, said pressure hydraulic supply system comprising:

a pressurized fluid source having a first low pressure output and a second high pressure output;

a directional valve connected with said low pressure output, said directional valve having a first position delivering said low pressure output with said lower pressure range consuming components, said directional valve having a second position delivering said low pressure output with said higher pressure range consuming components, said directional valve having a third position to re-circulate fluid to an inlet of said pressurized fluid source; and said high pressure output is connected with a fluid pressure regulator valve having at least one position connecting said high pressure outlet with said low pressure consuming components and a second position connecting said high pressure outlet with said low pressure consuming components and an inlet of said pressurized fluid source and said regulating valve further having a third position preventing fluid communication between said high pressure outlet and said low pressure consuming component and said inlet of said pressurized fluid source.

* * * * *